(12) United States Patent
Shi et al.

(10) Patent No.: US 11,056,958 B2
(45) Date of Patent: Jul. 6, 2021

(54) ROTOR AND MOTOR HAVING THE SAME

(71) Applicant: Johnson Electric International AG, Murten (CH)

(72) Inventors: Jingxin Shi, Shenzhen (CN); Sijun Zhao, Shenzhen (CN); Luyan Bi, Shenzhen (CN); Pingman Zhang, Shenzhen (CN); Xionghui Liu, Shenzhen (CN); Lang Dai, Shenzhen (CN); Cong Lv, Shenzhen (CN); Feifei Huang, Shenzhen (CN); He Chi, Shenzhen (CN); Baoqiang Cheng, Shenzhen (CN); Seungpun Ho, Hong Kong (CN); Dawei Zhou, Hong Kong (CN); Zhijun Li, Shenzhen (CN); Zhiyu Chen, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 29 days.

(21) Appl. No.: 16/359,362

(22) Filed: Mar. 20, 2019

(65) Prior Publication Data
US 2019/0296625 A1 Sep. 26, 2019

(30) Foreign Application Priority Data
Mar. 21, 2018 (CN) .......................... 201810235187.1

(51) Int. Cl.
*H02K 13/00* (2006.01)
*H02K 1/28* (2006.01)
(Continued)

(52) U.S. Cl.
CPC ........... *H02K 23/22* (2013.01); *H02K 13/006* (2013.01); *H02K 1/28* (2013.01); *H02K 5/14* (2013.01); *H02K 7/003* (2013.01)

(58) Field of Classification Search
CPC ........ H02K 1/28; H02K 13/00; H02K 13/006; H02K 23/22; H02K 7/003
(Continued)

(56) References Cited

U.S. PATENT DOCUMENTS 3,831,268 A * 8/1974 Boyd ..................... H02K 1/26
29/598
5,710,473 A * 1/1998 Nobe ..................... H02K 3/32
310/236
(Continued)

FOREIGN PATENT DOCUMENTS

CN 201898402 U * 7/2011
GB 1513502 A 6/1978
(Continued)

OTHER PUBLICATIONS

JP-2015008597-A (English Translation) (Year: 2015).*
(Continued)

*Primary Examiner* — Quyen P Leung
*Assistant Examiner* — Alexander Moraza
(74) *Attorney, Agent, or Firm* — Millman IP Inc.

(57) ABSTRACT

A rotor of an electric motor includes a rotating shaft, a rotor core and a commutator fixed to the rotating shaft, and a first sleeve, a second sleeve and a third sleeve arranged around the rotating shaft. The first sleeve is located on a side of the rotor core away from the commutator and abuts against the rotor core, the second sleeve is located between the rotor core and the commutator, and the third sleeve is located on a side of the commutator away from the rotor core.

10 Claims, 4 Drawing Sheets

(51) Int. Cl.
  *H02K 5/14* (2006.01)
  *H02K 23/22* (2006.01)
  *H02K 7/00* (2006.01)

(58) Field of Classification Search
  USPC .......................................... 310/233–239, 51
  See application file for complete search history.

(56) References Cited

U.S. PATENT DOCUMENTS

| 2001/0022483 | A1* | 9/2001 | Lau | H02K 3/38 |
| | | | | 310/261.1 |
| 2013/0307380 | A1* | 11/2013 | Zeng | H02K 11/05 |
| | | | | 310/68 R |
| 2015/0303769 | A1* | 10/2015 | Mao | H02K 15/08 |
| | | | | 310/83 |

FOREIGN PATENT DOCUMENTS

| JP | 3219666 B2 | 10/2001 |
| JP | 2015008597 A | * 1/2015 |
| JP | 2015008597 A | 1/2015 |

OTHER PUBLICATIONS

CN-201898402-U (English Translation) (Year: 2011).*
European Search Report dated Aug. 8, 2019 in connection with corresponding European application No. EP19164058.0.
English translation of Japanese patent publication No. JP2015008597.
English translation of Japanese patent publication No. JP3219666.

* cited by examiner

ROTOR AND MOTOR HAVING THE SAME

CROSS REFERENCE TO RELATED APPLICATIONS

This non-provisional patent application claims priority under 35 U.S.C. § 119(a) from Patent Application No. 201810235187.1 filed in the People's Republic of China on Mar. 21, 2018.

FIELD

The present disclosure relates to a rotor and a motor having the rotor.

BACKGROUND

A rotor of a brushed direct current (DC) motor generally includes a rotating shaft, a rotor core, and a commutator fixed to the rotating shaft. The rotor is mounted to a stator of the motor via the rotating shaft and is rotatable with respect to the stator. Some rotors may generate large amounts of noise and vibration during rotation due to the structure of the assembly formed by the rotors and the components they carry.

SUMMARY

A rotor of an electric motor includes a rotating shaft, a rotor core and a commutator fixed to the rotating shaft, and a first sleeve, a second sleeve and a third sleeve arranged around the rotating shaft. The first sleeve is located on a side of the rotor core away from the commutator and abuts against the rotor core, the second sleeve is located between the rotor core and the commutator, and the third sleeve is located on a side of the commutator away from the rotor core.

DETAILED DESCRIPTION

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

Figure 1:
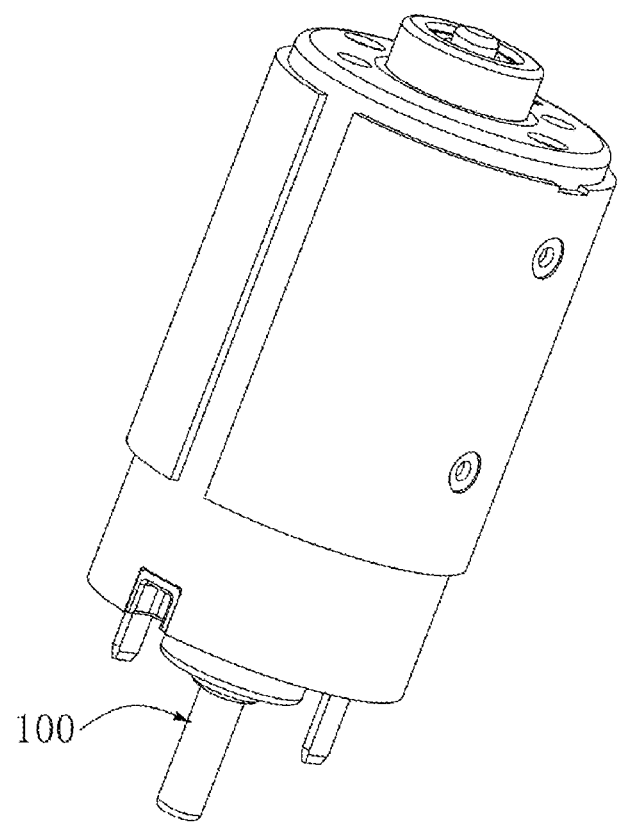
FIG. 1 is an isometric view of a motor according to an embodiment.

Referring to FIG. 1, in one embodiment, a brushed direct current (DC) motor 200 is mainly applied in vehicles and includes a stator and a rotor 100 that is rotatable with respect to the stator.

Figure 2:
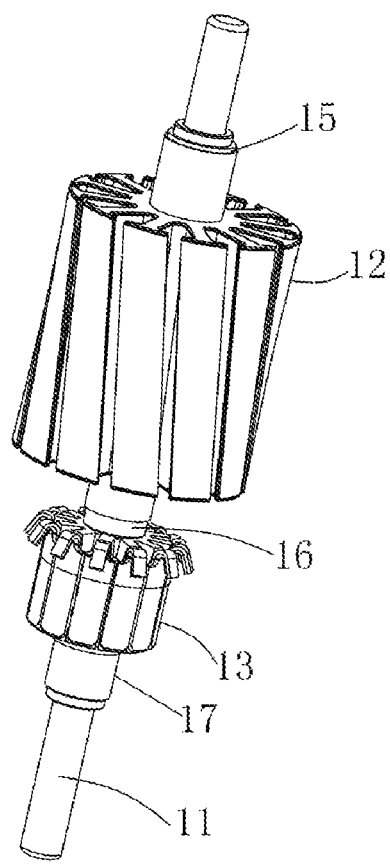
FIG. 2 is an isometric view of a rotor of the motor of FIG. 1.
Figure 3:
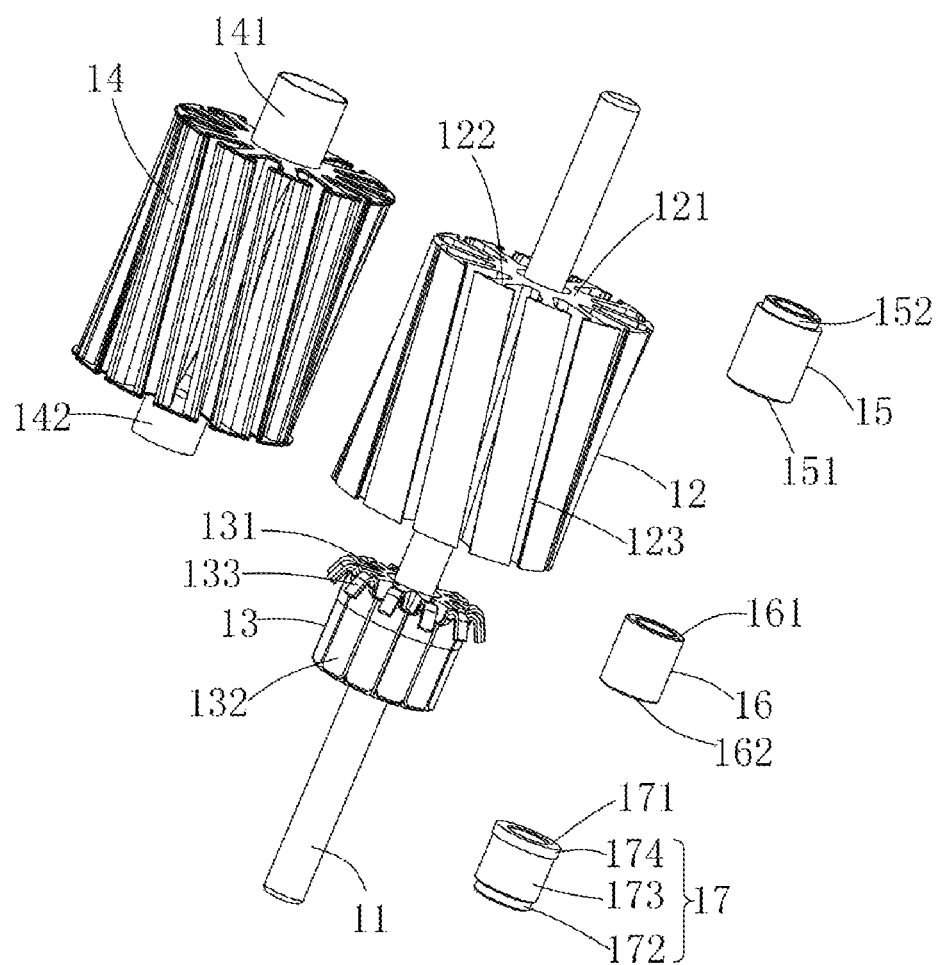
FIG. 3 is an isometric exploded view of the rotor of FIG. 2.

Referring to FIGS. 2 and 3, the rotor 100 includes a rotating shaft 11, a rotor core 12 and a commutator 13 that are securely arranged around the rotating shaft 11, and a rotor winding (not shown) wound around the rotor core 12. The wire ends of the rotor winding are respectively connected to the commutator segments 132 of the commutator 13 to create an electrical connection with the corresponding commutator segments 132.

The rotor core 12 includes a central portion 121 that is securely arranged around the rotating shaft 11 and a number of teeth 122 that protrude radially outward from the central portion 121. A wire slot 123 is formed between two adjacent teeth 122. The rotor winding is wound around the teeth 122 and received in the wire slots 123. The slots 123 are skewed. That is, the extending direction of the slots is not parallel to the rotation axis of the rotating shaft 11. In the embodiment, the rotor core 12 is formed by stacking a plurality of identically shaped lamination sheets along the axial direction. Any two adjacent lamination sheets are circumferentially offset by a predetermined angle from each other so as to form the skewed wire slots 123. In an alternative embodiment, the wire slots 123 may be straight. That is, the wire slots 123 extend along a direction that is parallel to the rotation axis of the rotating shaft 11.

The commutator 13 is substantially cylindrical. The commutator 13 includes a cylindrical insulating base 131 that is securely arranged around the rotating shaft 11, and a number of commutator segments 132 that are circumferentially arranged on the outer lateral surface of the insulating base 131. The end of each commutator segment 132 adjacent to the rotor core 12 is provided with a hook 133. The wire ends of the rotor winding are respectively connected to the hooks 133 to create an electrical connection.

The motor rotor 100 further includes a first sleeve 15, a second sleeve 16, and a third sleeve 17 that are arranged around the rotating shaft 11. The first sleeve 15 and the third sleeve 17 are respectively arranged outside the rotor core 12, that is, the rotor core 12 and the commutator 13 are located between the first sleeve 15 and the third sleeve 17. The first sleeve 15 is located on a side of the rotor core 12 away from the commutator 13 and is in contact with the rotor core 12. The second sleeve 16 is located between the rotor core 12 and the commutator 13, and opposite ends of the second sleeve 16 are in contact with the rotor core 12 and the commutator 13, respectively. The third sleeve 17 is located on the side of the commutator 13 away from the rotor core 12 and is in contact with the commutator 13. The first sleeve 15, the second sleeve 16, and the third sleeve 17 are tightly arranged around the rotating shaft 11. That is, the inner holes of the three sleeves are in interference fit with the rotating shaft 11, thereby increasing the rigidity of the rotor 100. As a result, the natural frequency of the rotor 100 is increased, and the increased natural frequency deviates from or away from the frequency range of the force harmonics of the rotor 100 during operation of the motor 200, which reduces or avoids resonance effects, thereby improving noise and vibration. In one embodiment, the lengths of the first sleeve 15, the second sleeve 16, and the third sleeve 17 may be selected in the range of 3-20 mm according to need.

Specifically, an end of the first sleeve 15 adjacent to the rotor core 12 has a first contact surface 151 that is in contact with the central portion 121 of the rotor core 12. The first contact surface 151 preferably abuts against the end of the central portion 121 adjacent to the first sleeve 15. The end of the first sleeve 15 away from the rotor core 12 is provided with a protrusion 152 having a reduced outer diameter to facilitate mounting of the first sleeve 15 to the stator.

Opposite ends of the second sleeve 16 respectively have a second contact surface 161 and a third contact surface 162. The second contact surface 161 is in contact with the central portion 121 of the rotor core 12, and the third contact surface 162 is in contact with the insulating base 131 of the commutator 13. The second contact surface 161 is preferably abutted against the end of the central portion 121 adjacent to the second sleeve 16, and the third contact surface 162 is preferably abutted against the end of the insulating base 131 adjacent to the second sleeve 16.

One end of the third sleeve 17 adjacent to the commutator 13 has a fourth contact surface 171 which is in contact with the insulating base 131 of the commutator 13. The fourth contact surface 171 is preferably abutted against the end of the insulating base 131 adjacent to the third sleeve 17.

The third sleeve 17 includes a main body 173 and a first protrusion 172 and a second protrusion 174 at opposite ends of the main body 173. The first protrusion 172 protrudes from one end of the body 173 in the axial direction, and has a diameter less than the diameter of the main body 173. The second protrusion 174 extends in the radial direction from the circumferential surface of the other end of the main body 173. The end of the second protrusion 174 that is away from the first protrusion 172 is the fourth contact surface 171.

The first sleeve 15 and the third sleeve 17 are made of an iron-based material by powder metallurgy and have high strength. It can be understood that the first sleeve 15 and the third sleeve 17 can also be made of powder metallurgy from other materials when needed.

An insulating bracket 14 is arranged around the rotor core 12, and the rotor winding is wound around the insulating bracket 14. A first sleeve receiver 141 and a second sleeve receiver 142 are respectively formed at opposite ends of the insulating bracket 14. The first sleeve receiver 141 is arranged around the first sleeve 15 to insulate the rotor winding from the first sleeve 15, and the second sleeve receiver 142 is arranged around the second sleeve 16 to insulate the rotor winding from the second sleeve 16.

Figure 4:
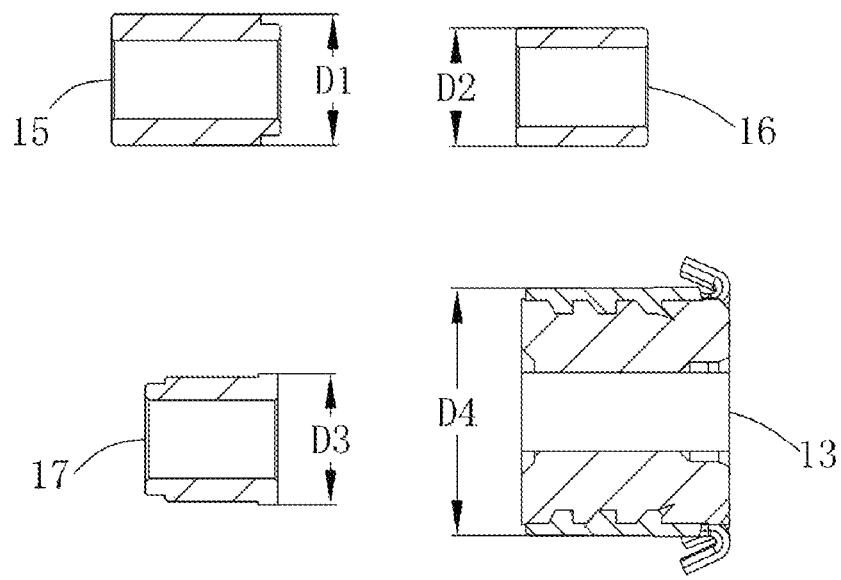
FIG. 4 is a cross-sectional view of a commutator, a first sleeve, a second sleeve, and a third sleeve of the rotor of FIG. 2.

Referring to FIG. 4, in the embodiment, the maximum outer diameter D1 of the first sleeve 15, the maximum outer diameter D2 of the second sleeve 16 and the maximum outer diameter D3 of the third sleeve 17 are the same. The maximum outer diameter D1 of the first sleeve 15, the maximum outer diameter D2 of the second sleeve 16, and the maximum outer diameter D3 of the third sleeve 17 are less than 0.9 times the outer diameter D4 of the commutator 13. Preferably, the maximum outer diameter D1 of the first sleeve 15, the maximum outer diameter D2 of the second sleeve 16, and the maximum outer diameter D3 of the third sleeve 17 are less than 0.8 times the outer diameter D4 of the commutator 13. In other embodiments, the maximum outer diameter D1 of the first sleeve 15, the maximum outer diameter D2 of the second sleeve 16, and the maximum outer diameter D3 of the third sleeve 17 may be different.

Therefore, the technical solutions of embodiments of the present disclosure have been clearly and completely described above. Apparently, the described embodiments are merely part of, rather than all of, the embodiments of the present disclosure. A person skilled in the art may make various combinations of technical features in the various embodiments to meet practical needs. Based on the described embodiments of the present disclosure, any other embodiment obtained by a person skilled in the art without paying creative efforts shall also fall within the scope of the present disclosure.

The invention claimed is:

1. A rotor of an electric motor comprising:
   a rotating shaft;
   a rotor core and a commutator fixed to the rotating shaft, the commutator comprising a cylindrical insulating base securely arranged around the rotating shaft and a plurality of commutator segments circumferentially arranged on the outer lateral surface of the insulating base; and
   a first sleeve, a second sleeve and a third sleeve arranged around the rotating shaft;
   wherein the first sleeve is located on a side of the rotor core away from the commutator and abuts against the rotor core, the second sleeve is located between the rotor core and the commutator, and the third sleeve is located on a side of the commutator away from the rotor core;
   one end of the third sleeve adjacent to the commutator has a fourth contact surface, and the fourth contact surface is in contact with the commutator, the third sleeve comprises a main body and first and second protrusions at opposite ends of the main body, the first protrusion has a diameter less than a diameter of the main body, and an end surface of the second protrusion away from the first protrusion is the fourth contact surface.

2. The rotor according to claim 1, wherein one end of the first sleeve adjacent to the rotor core comprises a first contact surface, and the first contact surface is in contact with the rotor core.

3. The rotor according to claim 1, wherein the first sleeve, the second sleeve and the third sleeve are fixed to the rotating shaft in an interference fit manner.

4. The rotor according to claim 1, wherein opposite ends of the second sleeve comprise a second contact surface and a third contact surface, respectively, the second contact surface is in contact with the rotor core, and the third contact surface is in contact with the commutator.

5. The rotor according to claim 1, wherein the first sleeve, the second sleeve and the third sleeve have the same maximum outer diameter.

6. The rotor according to claim 5, wherein a maximum outer diameter of each of the first sleeve, the second sleeve and the third sleeve is less than 0.9 times an outer diameter of the commutator.

7. The rotor according to claim 6, wherein the maximum outer diameter of each of the first sleeve, the second sleeve and the third sleeve is less than 0.8 times an outer diameter of the commutator.

8. The rotor according to claim 1, further comprising an insulated bracket arranged around the rotor core, a first sleeve receiver and a second sleeve receiver that protrude from opposite ends of the insulated bracket, wherein the first sleeve receiver is arranged around the first sleeve, and the second sleeve receiver is arranged around the second sleeve.

9. A motor comprising a rotor of claim 1.

10. A rotor of an electric motor comprising:
    a rotating shaft;
    a rotor core and a commutator fixed to the rotating shaft, the commutator comprising a cylindrical insulating base securely arranged around the rotating shaft and a plurality of commutator segments circumferentially arranged on the outer lateral surface of the insulating base; and
    a first sleeve, a second sleeve and a third sleeve arranged around the rotating shaft;
    wherein the first sleeve is located on a side of the rotor core away from the commutator and abuts against the rotor core, the second sleeve is located between the rotor core and the commutator, and the third sleeve is located on a side of the commutator away from the rotor core;
    the rotor further comprises an insulated bracket arranged around the rotor core, a first sleeve receiver and a second sleeve receiver that protrude from opposite ends of the insulated bracket, wherein the first sleeve receiver is arranged around the first sleeve, and the second sleeve receiver is arranged around the second sleeve.

\* \* \* \* \*